(12) United States Patent
Kim

(10) Patent No.: US 10,971,738 B2
(45) Date of Patent: Apr. 6, 2021

(54) METHOD OF MANUFACTURING ELECTROLYTE MEMBRANE WITH HIGH-DURABILITY FOR FUEL CELL

(71) Applicants: HYUNDAI MOTOR COMPANY, Seoul (KR); KIA MOTORS CORPORATION, Seoul (KR)

(72) Inventor: Yong Min Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 181 days.

(21) Appl. No.: 16/203,063

(22) Filed: Nov. 28, 2018

(65) Prior Publication Data

US 2019/0312287 A1 Oct. 10, 2019

(30) Foreign Application Priority Data

Apr. 4, 2018 (KR) .................. 10-2018-0039278

(51) Int. Cl.
| | |
|---|---|
| *H01M 8/02* | (2016.01) |
| *H01M 8/0271* | (2016.01) |
| *H01M 8/1081* | (2016.01) |
| *H01M 8/1044* | (2016.01) |
| *H01M 8/1086* | (2016.01) |
| *H01M 8/1062* | (2016.01) |

(52) U.S. Cl.
CPC ....... *H01M 8/0271* (2013.01); *H01M 8/1044* (2013.01); *H01M 8/1062* (2013.01); *H01M 8/1081* (2013.01); *H01M 8/1086* (2013.01)

(58) Field of Classification Search
CPC ............ H01M 8/02; H01M 8/12; H01M 8/10; H01M 8/0271
See application file for complete search history.

(56) References Cited

U.S. PATENT DOCUMENTS

| 6,042,959 A | 3/2000 | Debe et al. | |
|---|---|---|---|
| 2009/0155662 A1* | 6/2009 | Durante ................. | C08J 5/2281 429/500 |

FOREIGN PATENT DOCUMENTS

| KR | 10-2001-0031027 A | 4/2001 | |
|---|---|---|---|
| KR | 10-0517752 B1 | 9/2005 | |
| KR | 10-2009-0032772 A | 4/2009 | |
| KR | 10-1073014 B1 | 10/2011 | |
| KR | 1020130004615 A | * 1/2013 | ............. H01M 8/04 |
| KR | 10-2015-0045305 A | 4/2015 | |
| KR | 10-2015-0062496 A | 6/2015 | |

(Continued)

OTHER PUBLICATIONS

Machine Translation of: KR 1020130004615 A, Kim et al., Jan. 14, 2013.*

*Primary Examiner* — Kenneth J Douyette
(74) *Attorney, Agent, or Firm* — Morgan, Lewis & Bockius LLP

(57) ABSTRACT

A method of manufacturing an electrolyte membrane for fuel cells with improved durability for fuel cells includes: preparing a substrate; applying a first ionomer solution onto the substrate; inserting a porous support into the first ionomer solution to impregnate the first ionomer solution in the porous support; allowing the first ionomer solution-impregnated porous support to stand; applying a second ionomer solution to the first ionomer solution-impregnated porous support; and drying the porous support.

12 Claims, 4 Drawing Sheets

(56) References Cited

FOREIGN PATENT DOCUMENTS

KR        10-0684787 B1    2/2017
KR        10-1808283 B1    12/2017

\* cited by examiner

[FIG.1]
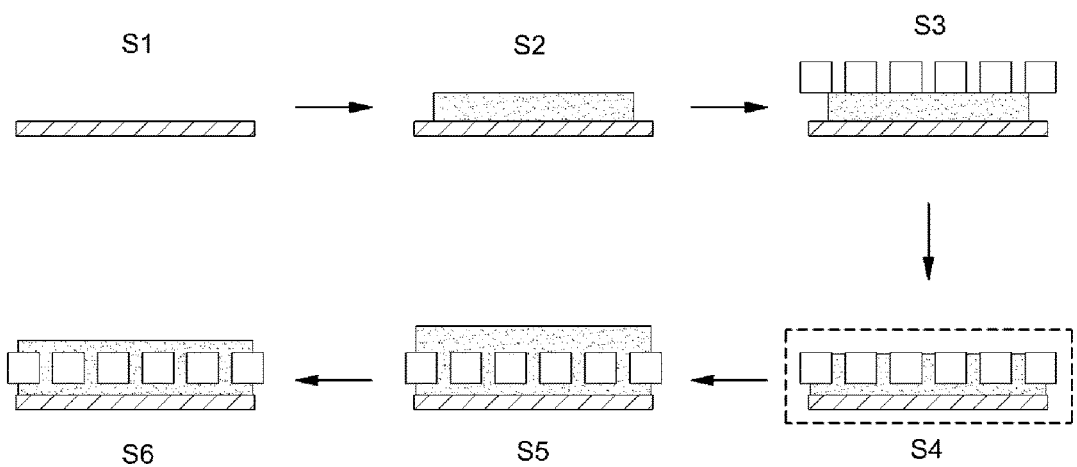
[FIG.2]
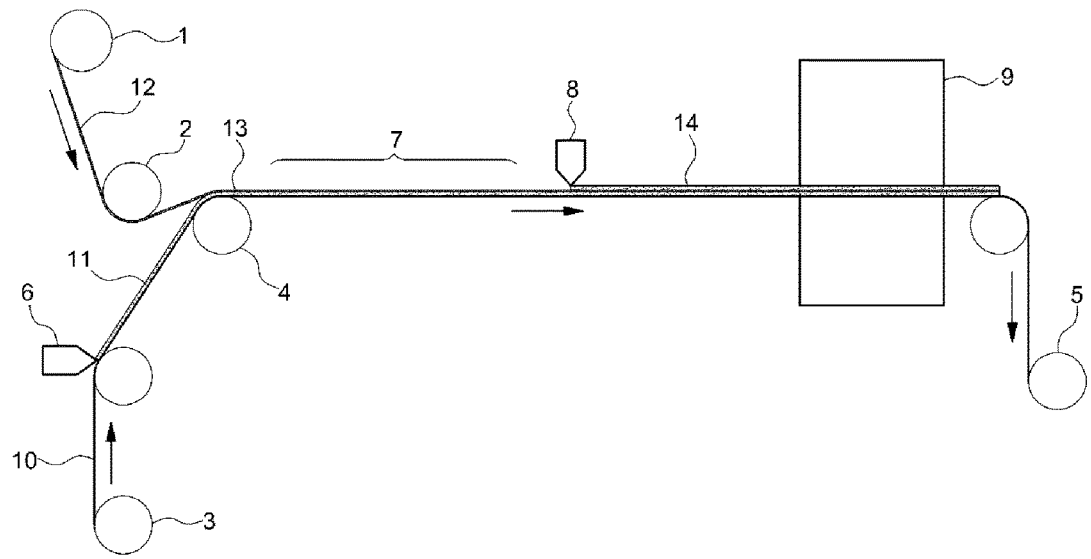

[FIG.3]
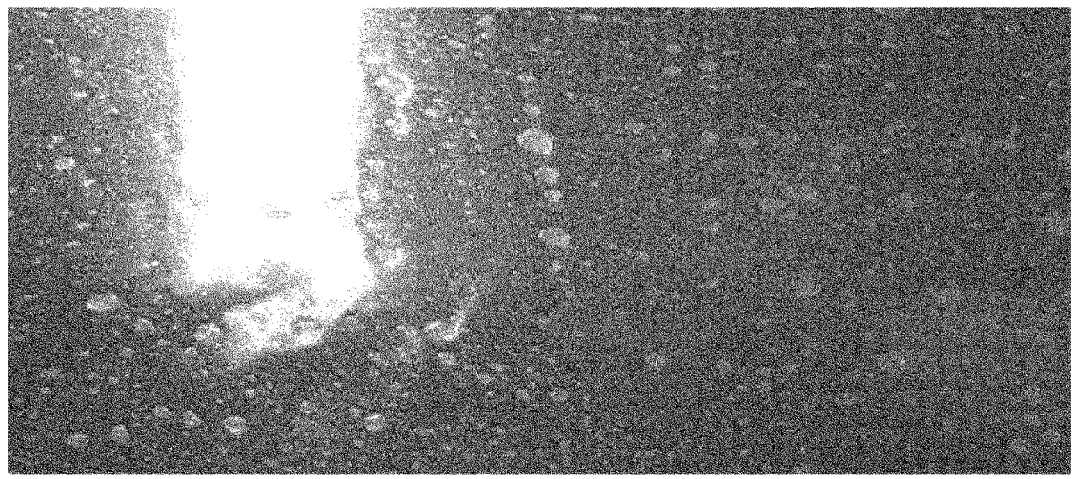

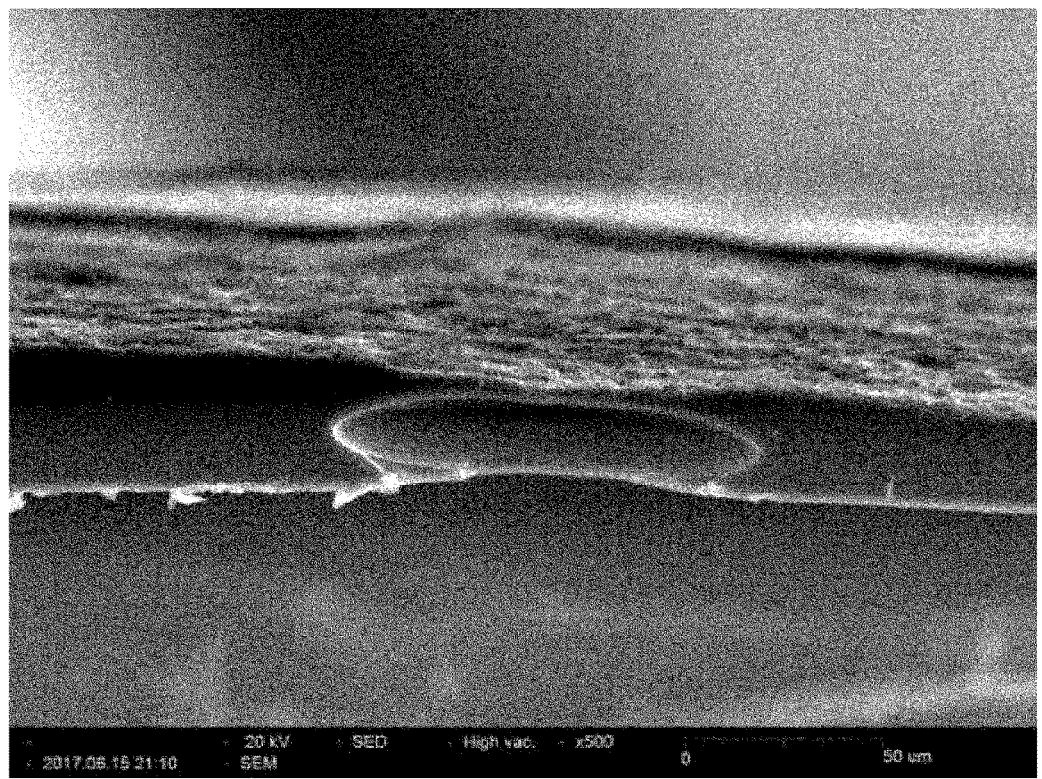
[FIG. 4]

[FIG.5]
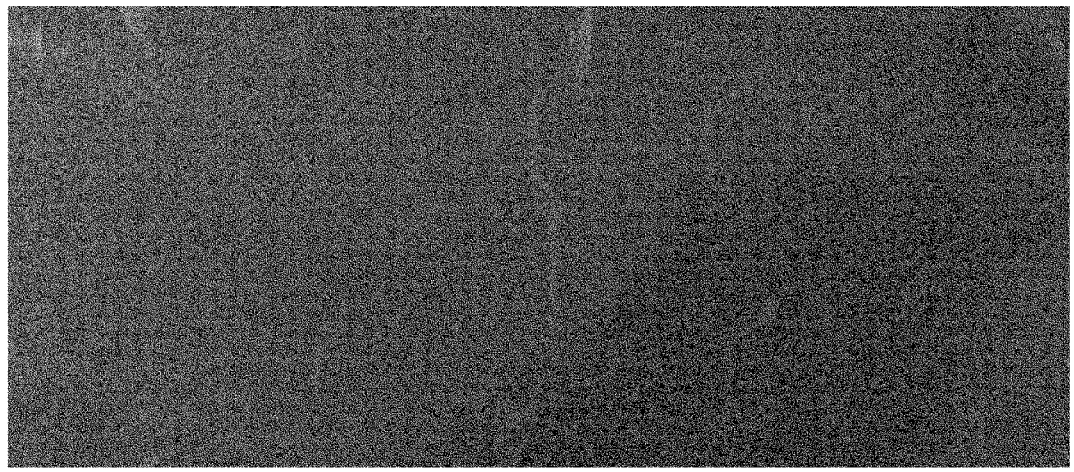
[FIG.6]
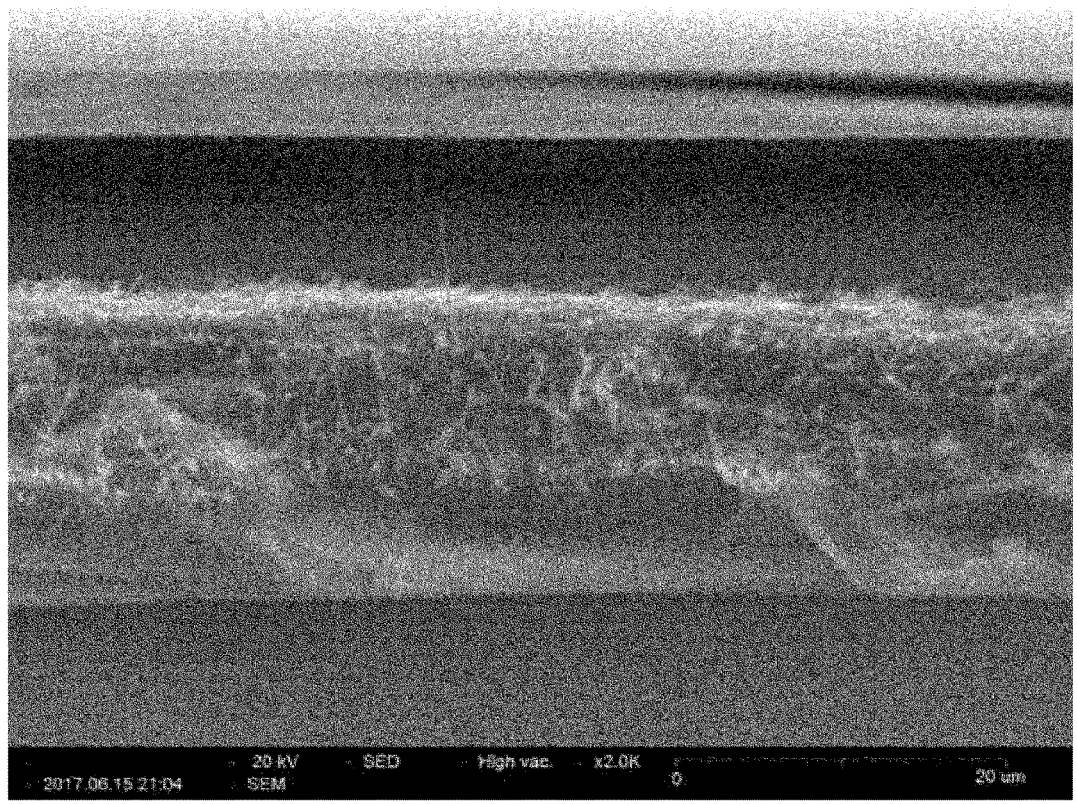

METHOD OF MANUFACTURING ELECTROLYTE MEMBRANE WITH HIGH-DURABILITY FOR FUEL CELL

CROSS-REFERENCE TO RELATED APPLICATION

This application claims, under 35 U.S.C. § 119(a), the benefit of priority to Korean Patent Application No. 10-2018-0039278 filed on Apr. 4, 2018, the entire contents of which are incorporated herein by reference.

TECHNICAL FIELD

The present disclosure relates to a method of manufacturing an electrolyte membrane with high durability for fuel cells.

BACKGROUND

Electrolyte membranes in proton exchange membrane fuel cells (PEMFCs) function to conduct protons. In order to conduct the protons, electrolyte membranes are manufactured using ionomers. The ionomers impregnate water to selectively transport protons produced at an anode to a cathode.

Electrolyte membranes undergo great shrinkage and expansion based on impregnation of water because they are made of ionomers. In an attempt to compensate for this phenomenon, electrolyte membranes are manufactured by impregnating ionomers using porous polytetrafluoroethylene (PTFE) as a support. Generally used porous PTFE is an expanded PTFE produced by expanding PTFE, which is simply referred to as "e-PTFE".

All pores of e-PTFE should be impregnated with ionomers in order to form channels through which protons are transported. However, small pores of e-PTFE cannot be easily filled due to considerably high inner pressure. Unfilled pores cannot form a channel, thus negatively affecting the performance and durability of fuel cells.

For this reason, there is increasing need for methods for manufacturing electrolyte membranes which are capable of preventing foaming to provide excellent durability and retain superior performance.

The above information disclosed in this Background section is provided only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with the prior art.

In conventional methods of manufacturing electrolyte membranes, when an e-PTFE porous support impregnated with an ionomer solution is dried at a temperature of room temperature or higher, surface tension is decreased, capillary height is lowered and the ionomer hardens under these conditions. Primary drying is finished in the presence of pores completely unfilled with the solution, and then secondary ionomer application is conducted. As a result, fine, unfilled e-PTFE pores generate foams.

Accordingly, it is an object of the present disclosure to provide a method of manufacturing an electrolyte membrane for fuel cells that is capable of inhibiting generation of foams by fine e-PTFE pores, which cannot be provided by conventional inventions, based on the relationship between the drying temperature and capillary action.

The objects of the present disclosure are not limited to those described above. The objects of the present disclosure will be clearly understood from the following description and could be implemented by means defined in the claims and a combination thereof.

According to an exemplary embodiment of the present disclosure, a method for manufacturing an electrolyte membrane with improved durability for fuel cells includes: preparing a substrate; applying a first ionomer solution onto the substrate; inserting a porous support into the first ionomer solution to impregnate the first ionomer solution in the porous support; allowing the first ionomer solution-impregnated porous support to stand, applying a second ionomer solution to the first ionomer solution-impregnated porous support; and drying the resulting porous support.

The substrate may be release paper selected from polyethylene terephthalate (PET), polyethylene naphthalate (PEN), polyimide (PI) and polypropylene (PP).

The first ionomer solution may include an ionomer selected from the group consisting of sulfonated polyimide (S-PI), sulfonated polyarylethersulfone (S-PAES), sulfonated polyetheretherketone (S-PEEK), perfluorosulfonic acid (PFSA), sulfonated polybenzimidazole (S-PBI), sulfonated polysulfone (S-PSU), sulfonated polystyrene (S-PS), sulfonated polyphosphazene and a mixture thereof.

The second ionomer solution may include an ionomer selected from the group consisting of sulfonated polyimide (S-PI), sulfonated polyarylethersulfone (S-PAES), sulfonated polyetheretherketone (S-PEEK), perfluorosulfonic acid (PFSA), sulfonated polybenzimidazole (S-PBI), sulfonated polysulfone (S-PSU), sulfonated polystyrene (S-PS) and sulfonated polyphosphazene and a mixture thereof.

The porous support may include an expanded polytetrafluoroethylene (e-PTFE) support.

The application of the first ionomer solution may be carried out by a bar coating, gravure coating or slot-die coating method.

The application of the second ionomer solution may be carried out by a bar coating, gravure coating or slot-die coating method.

The first ionomer solution-impregnated porous support may be allowed to stand at 18° C. to 30° C.

The first ionomer solution-impregnated porous support may be allowed to stand at a pressure of 0.1 to 1 atm.

The first ionomer solution-impregnated porous support may be allowed to stand for 5 to 10 minutes.

The second ionomer solution may be applied onto the porous support, without an additional drying process, after allowing the first ionomer solution-impregnated porous support to stand.

The second ionomer solution may be applied onto the porous support, after allowing the first ionomer solution-impregnated porous support to stand and before completely drying the solvent of the first ionomer solution.

The drying may be carried out at 60° C. to 80° C. for 5 to 30 minutes.

The method may further include heat-treating at 140° C. to 160° C. for 5 to 30 minutes after applying the second ionomer solution.

Other aspects and exemplary embodiments of the invention are discussed infra.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein:

FIG. 1 shows a process of manufacturing an electrolyte membrane according to the present disclosure;

FIG. 2 shows a process of continuously manufacturing an electrolyte membrane according to the present disclosure, based on a roll-to-roll method;

FIG. 3 shows the morphology of the surface of an electrolyte membrane manufactured in Comparative Example by a conventional method of manufacturing an electrolyte membrane;

FIG. 4 is an SEM image showing the cross-section of the electrolyte membrane manufactured in Comparative Example by the conventional method;

FIG. 5 shows the morphology of the surface of an electrolyte membrane manufactured in Example by a method of manufacturing an electrolyte membrane according to the present disclosure; and FIG. 6 is an SEM image showing the cross-section of the electrolyte membrane manufactured in Example by the method according to the present disclosure.

DETAILED DESCRIPTION

The objects described above, and other objects, features and advantages will be clearly understood from the following exemplary embodiments with reference to the annexed drawings. However, the present disclosure is not limited to the embodiments and will be embodied in different forms. The embodiments are suggested only to offer thorough and complete understanding of the disclosed contents and to sufficiently inform those skilled in the art of the technical concept of the present disclosure.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

The present disclosure relates to a method for manufacturing an electrolyte membrane for fuel cells including: preparing a substrate; applying a first ionomer solution to the substrate; inserting a porous support into the first ionomer solution to impregnate the first ionomer solution in the porous support; allowing the first ionomer solution-impregnated porous support to stand; applying a second ionomer solution to the first ionomer solution-impregnated porous support; and drying the resulting porous support.

Hereinafter, the process of respective steps of the electrolyte membrane for fuel cells according to the present disclosure as described above will be described in detail with reference to FIG. 1.

1) Preparing Substrate (S1):

Any substrate may be used without particular limitation so long as it can serve as a base to which the ionomer solution is applied.

In an embodiment of the present disclosure, the substrate may be release paper. The release paper may be any one selected from polyethylene terephthalate (PET), polyethylene naphthalate (PEN), polyimide (PI), and polypropylene (PP).

2) Applying First Ionomer Solution (S2):

This is a step of applying an ionomer solution to the supplied substrate and the first ionomer solution may be sulfonated polyimide (S-PI), sulfonated polyarylethersulfone (S-PAES), sulfonated polyetheretherketone (S-PEEK), perfluorosulfonic acid (PFSA), sulfonated polybenzimidazole (S-PBI), sulfonated polysulfone (S-PSU), sulfonated polystyrene (S-PS), sulfonated polyphosphazene and a mixture thereof. The ionomer according to the present disclosure may form a conductive film, based on crosslinkage.

3) Inserting Porous Support into First Ionomer (S3)

This is a step of inserting a porous support into the ionomer solution-applied substrate. In this step, the first ionomer solution impregnates into impregnation channels (pores) of the porous support based on capillary action.

Here, the porous support may be expanded polytetrafluoroethylene and any porous support may be used without limitation so long as it can result in capillary action through pores.

The porous support according to the present disclosure may have a porosity of 50 to 90%, or more specifically 70 to 90% and an inner pore size of 10 μm or less. When the porosity is less than 50%, impregnation of the solution is difficult, the absolute content of the solution is low and proton conductivity is thus deteriorated, and when the porosity is higher than 90%, mechanical stability of the membrane is disadvantageously deteriorated.

4) Allowing the First Ionomer Solution-Impregnated Porous Support to Stand (S4):

This is a step of allowing the ionomer solution to be sufficiently impregnated in the porous support and does not involve an additional treatment for drying or heat treatment.

The allowing the first ionomer solution-impregnated porous support to stand means that aging it, leaving it, resting it, keeping it, or being left-stopping it.

The important feature of this step is to prevent both a decrease in surface tension of impregnation channels (pores) of the porous support due to increased temperature of the first ionomer solution and crystallization caused by drying. Decreased surface tension may prevent capillary action from occurring, and crystallization causes deterioration in contact force with the second ionomer solution to be post-applied and thus forms areas where foams are generated in impregnation channels of the porous support.

In order to accelerate capillary action effects, this step may be carried out under vacuum, 0.1 to 1 atm, more specifically 0.1 to 0.5 atm. When the pressure is less than 0.1 atm, impregnation rate can be increased, but process rate is deteriorated, high cost is entailed and productivity is thus lowered, and when the pressure is higher than 1 atm, impregnation does not occur effectively.

Securing the vacuum condition may vacuumize impregnation channels (pores) of the porous support to remove foams present in pores, and permeate and adsorb the ionomer into the pores.

The standing is carried out at a temperature of 18 to 30° C., more specifically at 21 to 25° C., in order to prevent the ionomer solution from being sufficiently impregnated in the porous support due to the decreased surface tension of the first ionomer solution. When the standing temperature is 30° C. or higher, sufficient impregnation is impossible due to decreased surface tension, and drying occurs, crystallization of the first ionomer solution and foaming upon production of an electrolyte membrane, and when the standing temperature is 18° C. or less, mobility of the solution of the ionomer is deteriorated and, productivity and process rate are lowered.

5) Applying Second Ionomer Solution to First Ionomer Solution-Impregnated Porous Support (S5):

This is a step of secondarily applying an ionomer solution onto the surface of the ionomer-impregnated porous support (a surface not facing the substrate) with a coater of the present disclosure. The secondarily applied ionomer solution may be the same as the ionomer solution in the first ionomer application step, or may further include an additive, if necessary, or an ionomer solution with a different equivalent weight (EW).

6) Drying (S6):

This is a final step of removing the remaining solvent of the ionomer solution coated onto the substrate and the porous support, and the drying used herein is hot-air drying using hot-air convection or infra-red drying (IR).

Drying is carried out at a temperature of 60° C. to 90° C., more specifically at 60° C. to 80° C., for 5 to 30 minutes. When the drying temperature is less than 60° C., the remaining solvent present in and out the porous support is not sufficiently removed, a long drying time is required and economic efficiency is thus low. In addition, when the drying temperature is higher than 90° C., impurities may be generated in the process of evaporation of the solvent and ionomer.

After drying, the substrate and the porous support may be further subjected to heat treatment. Heat treatment is carried out at a temperature of 140 to 160° C. for 5 to 30 minutes.

The heat treatment may be conducted to remove the solvent left behind after drying.

As can be seen from FIG. 2 relating to a device for manufacturing an electrolyte membrane for fuel cells, the electrolyte membrane according to the present disclosure is manufactured by a continuous process based on a roll-to-roll method.

The roll-to-roll method means that the substrate 10 and the porous support 12 wound in the form of rolls 1 and 3 are unwound and transported through a plurality of transport rollers 2 and 4 along a predetermined transport route (shown as an arrow in the drawing), and then join together in an area of the transport roller 2 to form an electrolyte membrane 14, which is wound by a rewinder roller 5.

The stream of the roll-to-roll process is carried out by a porous support unwinder roller 1, a substrate unwinder roller 3 and an electrolyte membrane rewinder roller 5.

The substrate unwinder roller 3 unwinds and supplies the substrate 10 wound in the form of a roll through a predetermined route. At this time, the unwinding can be based on self-driving of the substrate unwinder roller 3. Alternatively, the unwinding of the substrate unwinder roller 3 can be finally based on the driving force of the electrolyte membrane rewinder roller 5 that winds the electrolyte membrane 14 joined with the porous support impregnated with first and second ionomer solutions.

The porous support unwinder roller 1 unwinds the porous support 12 wound in the form of a roll along a route enabling the porous support 12 to be joined to the substrate and then supplies the same. Finally, the porous support 12 is wound together with the substrate by the electrolyte membrane rewinder roller 5.

The electrolyte membrane rewinder roller 5 unwinds and harvests the polymer electrolyte membrane supplied by the substrate unwinder roller 3 and the porous support unwinder roller 1, based on driving force of the electrolyte membrane rewinder roller 5.

The ionomer solution is applied to the supplied substrate and porous support by coaters 6 and 8. The coater used herein is a bar coater, a slot-die coater, a gravure coater, or a combination thereof.

The overall process of manufacturing the electrolyte membrane according to the present disclosure will be described in brief. A substrate 10 is supplied from an unwinder roller 3 for the substrate and the starts being moved, while a porous support 12 is supplied from an unwinder roller 1 for the porous support and then starts being moved. A first ionomer solution is applied on the top of the moved substrate by a is first ionomer coater 6 and the substrate is joined to the porous support in an area 13, where transport rollers 2 and 4 are present, so that the substrate and the porous support are transported in one stream. Here, the porous support 12 faces a surface of the substrate to which the first ionomer solution is applied to another surface thereof. The substrate joined to the porous support passes through a standing area 7, where capillary action is accelerated by the first ionomer solution to impregnate into impregnation channels (pores) of the porous support. The porous support and the substrate sufficiently impregnated with the first ionomer solution pass through the standing area and then the second ionomer solution is applied to the surface of the porous support by a second ionomer coater 8. To be specific, the second ionomer solution is applied to another surface of the porous support not facing the substrate to form an electrolyte membrane 14 according to the present disclosure. The electrolyte membrane 14 is transported to a dryer 9 and is then subjected to drying to remove solvents of the first ionomer solution impregnated in the porous support and the second ionomer solution applied to the surface of the porous support to thereby complete a solid electrolyte membrane. Finally, the electrolyte membrane having undergone drying in the dryer 9 is wound by a rewinder roller 5 of the electrolyte membrane.

Hereinafter, the present disclosure will be described in more detail with reference to specific examples. However, examples according to the present is disclosure can be modified into various forms and should be not construed as limiting the scope of the present disclosure. The examples are suggested only to offer thorough and complete understanding of the disclosed contents and to sufficiently inform those skilled in the art of the technical concept of the present disclosure.

Example

Preparation of Ionomer Solution

A perfluorinated sulfonic acid ionomer was mixed with a solvent mixture consisting of normal propyl alcohol (nPA) and water as main ingredients to prepare 20 wt % ionomer dispersion and the ionomer dispersion was stirred at room temperature in a stirrer for about one day, to prepare an ionomer solution.

Production of Electrolyte Membrane

A polyethylene terephthalate (PET) substrate was primarily coated with the ionomer solution using a bar-coater, and an e-PTFE porous support having a pore size of 10 μm or less was inserted such that the ionomer solution was incorporated into the porous support and the substrate.

The ionomer solution-impregnated e-PTFE porous support and the substrate including the same were dried at room temperature for 5 minutes. After drying at room temperature, another surface of the porous support not facing the substrate was secondarily coated with the previously prepared ionomer solution using the bar-coater.

The secondarily coated porous support and the substrate including the same were dried by hot-air convection in an electric oven at 80° C. for 10 minutes to produce a polymer electrolyte membrane.

The produced electrolyte membrane was heat-treated at 160° C. for 30 minutes.

Comparative Example

Preparation of Ionomer Solution

The same coating solution as the ionomer solution prepared in Example above was prepared.

Production of Electrolyte Membrane

A polyethylene terephthalate (PET) substrate was primarily coated with the ionomer solution using a bar-coater, and an e-PTFE porous support having a pore size of 10 µm or less was inserted such that the ionomer solution was incorporated into the porous support and the substrate.

The ionomer solution-impregnated e-PTFE porous support and the substrate including the same were dried at 80° C. for 5 minutes.

After drying at room temperature, another surface of the porous support not facing the substrate was secondarily coated with the previously prepared ionomer solution using the bar-coater.

The secondarily coated porous support and the substrate including the same were dried by hot-air convection in an electric oven at 80° C. for 10 minutes to produce a polymer electrolyte membrane.

The produced electrolyte membrane was heat-treated at 160° C. for 30 minutes.

Scanning Electron Microscope (SEM) Analysis

The electrolyte membranes produced in Example and Comparative Example was subjected to SEM analysis. Results are shown in FIGS. 3 to 6.

FIGS. 3 and 4 show analysis results of Comparative Example.

FIG. 3 shows observation results of the surface of the electrolyte membrane produced in Comparative Example, confirming generation of more foam.

FIG. 4 is an SEM image showing the cross-section of the electrolyte membrane shown in FIG. 3, confirming generation of a void in the electrolyte membrane.

FIGS. 5 and 6 show analysis results of Example.

FIG. 5 shows observation results of the surface of the electrolyte membrane produced in Example, confirming no generation of foams.

FIG. 6 is an SEM image showing the cross-section of the electrolyte membrane shown in FIG. 5, confirming no generation of a void in the electrolyte membrane.

As apparent from the foregoing, the present disclosure provides an electrolyte membrane capable of inhibiting foaming, thereby improving performance and durability of fuel cells and reducing defect ratios upon production of MEAs. In addition, the present disclosure simplifies the overall process, thereby improving process rate and productivity.

The effects of the present disclosure are not limited to those mentioned above. It should be understood that the effects of the present disclosure include all effects that can be inferred from the description of the present disclosure.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing an electrolyte membrane for fuel cells, the method comprising steps of:
    preparing a substrate;
    applying a first ionomer solution onto the substrate;
    inserting a porous support into the first ionomer solution to impregnate the first ionomer solution in the porous support;
    allowing the first ionomer solution-impregnated porous support to stand;
    applying a second ionomer solution to the first ionomer solution-impregnated porous support; and
    drying the porous support,
    wherein, after the porous supported is inserted into the first ionomer solution, the first ionomer solution-impregnated porous support is allowed to stand at a pressure of 0.1 to 1 atm, and
    wherein the step of applying a second ionomer solution includes applying, after allowing the first ionomer solution-impregnated porous support to stand, the second ionomer solution onto the first ionomer solution-impregnated porous support, without an additional drying process.

2. The method according to claim 1, wherein the substrate is a release paper selected from the group consisting of polyethylene terephthalate (PET), polyethylene naphthalate (PEN), polyimide (PI), and polypropylene (PP).

3. The method according to claim 1, wherein the first ionomer solution comprises an ionomer selected from the group consisting of sulfonated polyimide (S-PI), sulfonated polyarylethersulfone (S-PAES), sulfonated polyetheretherketone (S-PEEK), perfluorosulfonic acid (PFSA), sulfonated polybenzimidazole (S-PBI), sulfonated polysulfone (S-PSU), sulfonated polystyrene (S-PS), sulfonated polyphosphazeneanda, and a mixture thereof.

4. The method according to claim 1, wherein the second ionomer solution comprises an ionomer selected from the group consisting of sulfonated polyimide (S-PI), sulfonated polyarylethersulfone (S-PAES), sulfonated polyetheretherketone (S-PEEK), perfluorosulfonic acid (PFSA), sulfonated polybenzimidazole (S-PBI), sulfonated polysulfone (S-PSU), sulfonated polystyrene (S-PS), sulfonated polyphosphazene, and a mixture thereof.

5. The method according to claim 1, wherein the porous support comprises an expanded polytetrafluoroethylene (e-PTFE) support.

6. The method according to claim 1, wherein, in the step of applying the first ionomer solution onto the substrate, the first ionomer solution is bar coated, gravure coated, or slot-die coated.

7. The method according to claim 1, wherein, in the step of applying the second ionomer solution onto the substrate, the second ionomer solution is bar coated, gravure coated, or slot-die coated.

8. The method according to claim 1, wherein, after the porous supported is inserted into the first ionomer solution, the first ionomer solution-impregnated porous support is allowed to stand at 18° C. to 30° C.

9. The method according to claim 1, wherein, after the porous supported is inserted into the first ionomer solution, the first ionomer solution-impregnated porous support is allowed to stand for 5 to 10 minutes before applying the second ionomer solution.

10. The method according to claim 1, wherein, in the step of applying the second ionomer solution to the first ionomer solution-impregnated porous support, the second ionomer solution is applied onto the porous support, after allowing the first ionomer solution-impregnated porous support to stand and before completely drying a solvent of the first ionomer solution.

11. The method according to claim 1, wherein the step of drying is carried out at 60° C. to 80° C. for 5 to 30 minutes.

12. The method according to claim 1, further comprising heat-treating at 140° C. to 160° C. for 5 to 30 minutes after the step of applying the second ionomer solution.

\* \* \* \* \*